United States Patent [19]

Castro

[11] Patent Number: 5,421,779

[45] Date of Patent: * Jun. 6, 1995

[54] COMPOSITE RECORDING MATERIALS, FACSIMILE INSTRUCTION LABELS AND METHOD OF DELIVERING HARD COPIES OF CONFIDENTIAL MESSAGES USING THE SAME

[75] Inventor: Peter D. Castro, New York, N.Y.

[73] Assignee: International Integrated Communications, Ltd., New York, N.Y.

[*] Notice: The portion of the term of this patent subsequent to Feb. 4, 2005 has been disclaimed.

[21] Appl. No.: 696,891

[22] Filed: May 8, 1991

[51] Int. Cl.$^6$ ................................................. B41L 1/22
[52] U.S. Cl. ........................................... 462/8; 462/55; 283/81; 283/100
[58] Field of Search ..................... 283/81, 100, 101, 98, 283/99; 462/8, 84, 54, 55, 56

[56] References Cited

U.S. PATENT DOCUMENTS

| | | | |
|---|---|---|---|
| 2,074,855 | 3/1937 | Paasche | 462/55 X |
| 2,251,742 | 8/1941 | Kline | 204/2 |
| 2,396,833 | 3/1946 | D'Humy | 282/22 |
| 3,711,353 | 1/1973 | Zimmer | 156/267 |
| 4,303,307 | 12/1981 | Tureck et al. | 350/276 R |
| 4,428,997 | 1/1984 | Shulman | 428/202 |
| 4,454,980 | 6/1984 | Poehler | 229/69 |
| 4,522,429 | 6/1985 | Gardner et al. | 283/91 |
| 4,573,409 | 3/1986 | Clar et al. | 101/426 |
| 4,637,635 | 1/1987 | Levine | 283/81 X |
| 4,684,563 | 8/1987 | Hayashi et al. | 428/207 |
| 4,741,558 | 5/1988 | Louis | 462/55 |
| 4,757,901 | 7/1988 | Woods | 283/81 X |
| 4,824,142 | 4/1989 | Dossche | 282/11.5 |
| 4,835,028 | 5/1989 | Dey et al. | 428/67 |
| 4,867,481 | 9/1989 | Gundjian | 283/91 |
| 4,896,355 | 1/1990 | Iggulden et al. | 380/54 |
| 4,911,477 | 3/1990 | Shishido | 283/100 |
| 5,001,749 | 3/1991 | Iggulden et al. | 380/18 |
| 5,078,427 | 1/1992 | Ishii et al. | 283/100 X |
| 5,085,469 | 2/1992 | Castro | 283/100 X |

Primary Examiner—Paul A. Bell
Attorney, Agent, or Firm—Hopgood, Calimafde, Kalil, Blaustein & Judlowe

[57] ABSTRACT

Flexible composite material is provided upon which a facsimile message containing both confidential and non-confidential information can be recorded. In general, the composite material comprises a recording layer and a cover layer. The cover layer is disposed over a substantial portion of the recording layer to define a confidential message recording area and a non-confidential message recording area. The cover layer has a plurality of transverse perforation lines formed along the longitudinal extent of the cover layer. The transverse perforation lines are spaced apart in parallel fashion, and each pair of adjacent perforation lines forms a cover layer strip that can be selectively removed. One or more of the cover layer strips bear preprinted instructions as to how to reveal the non-confidential area without revealing the confidential message. Preferably, a releasable adhesive layer is disposed between the cover layer and recording layer, so as to releasably secure the same together without adversely affecting the integrity or functioning of the non-confidential or confidential recording area.

15 Claims, 15 Drawing Sheets

FIG. 5A

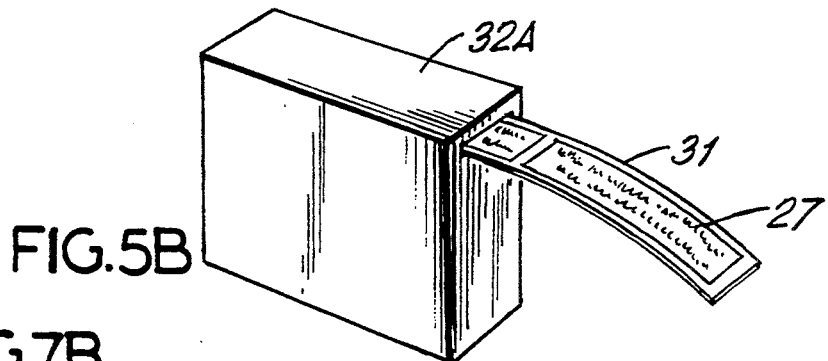
FIG. 5B
FIG. 7B
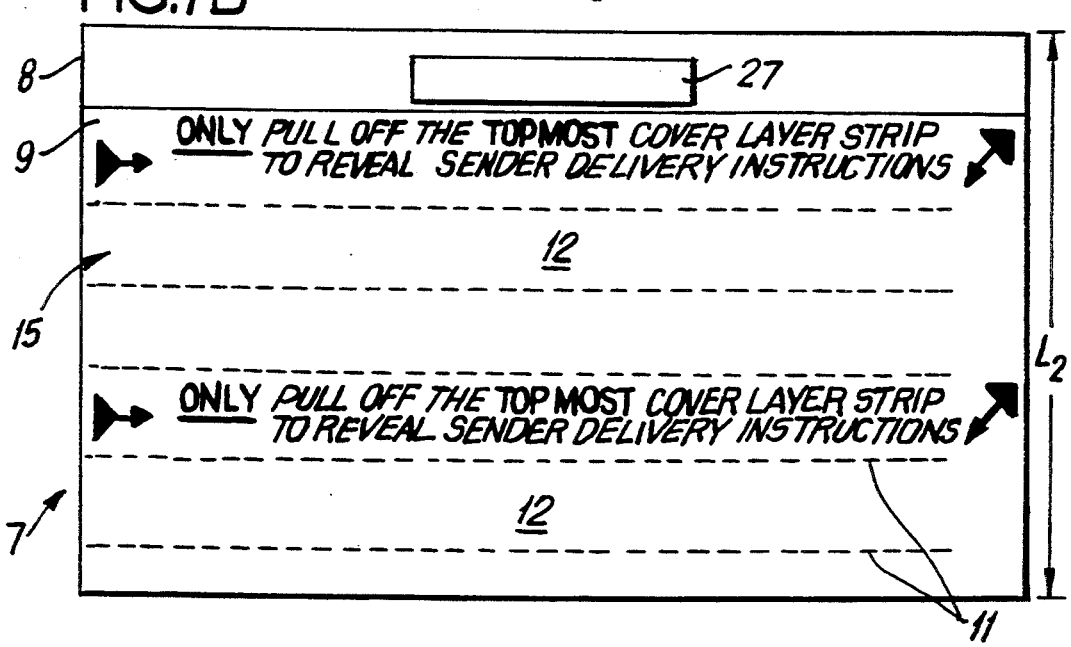
FIG. 7C
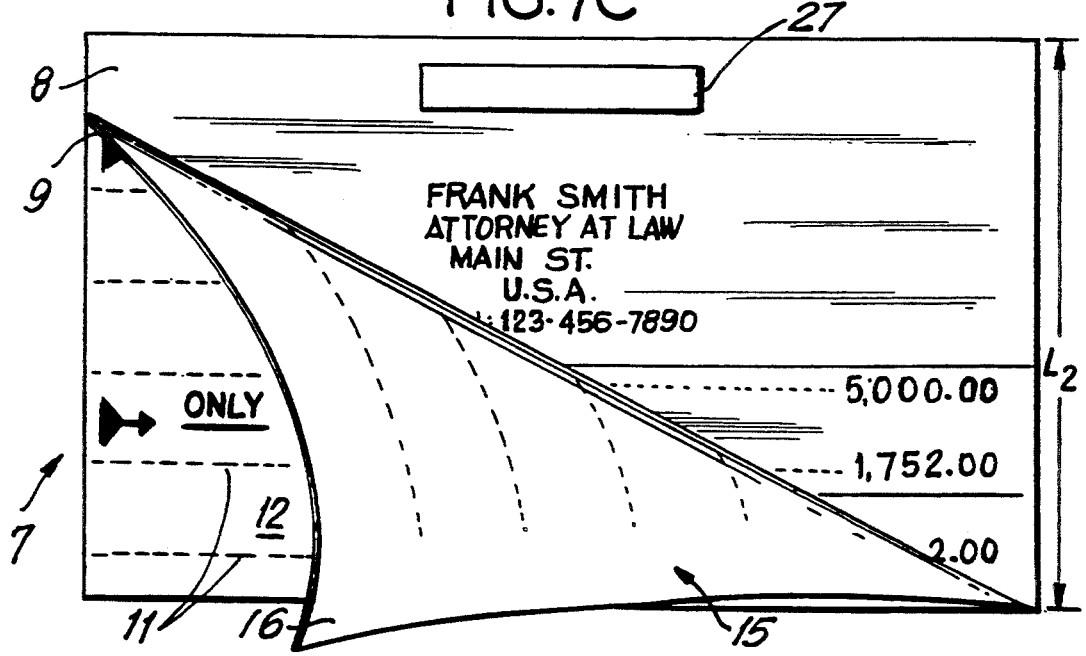

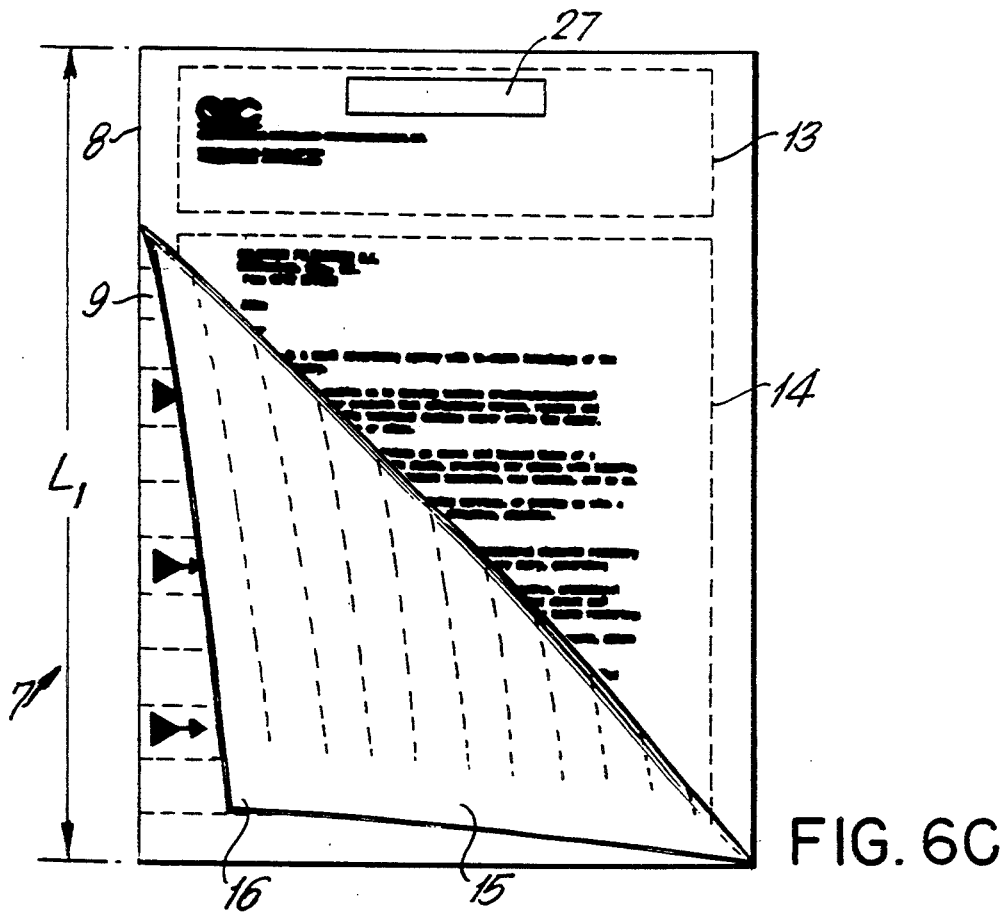
FIG. 6C
FIG. 7A
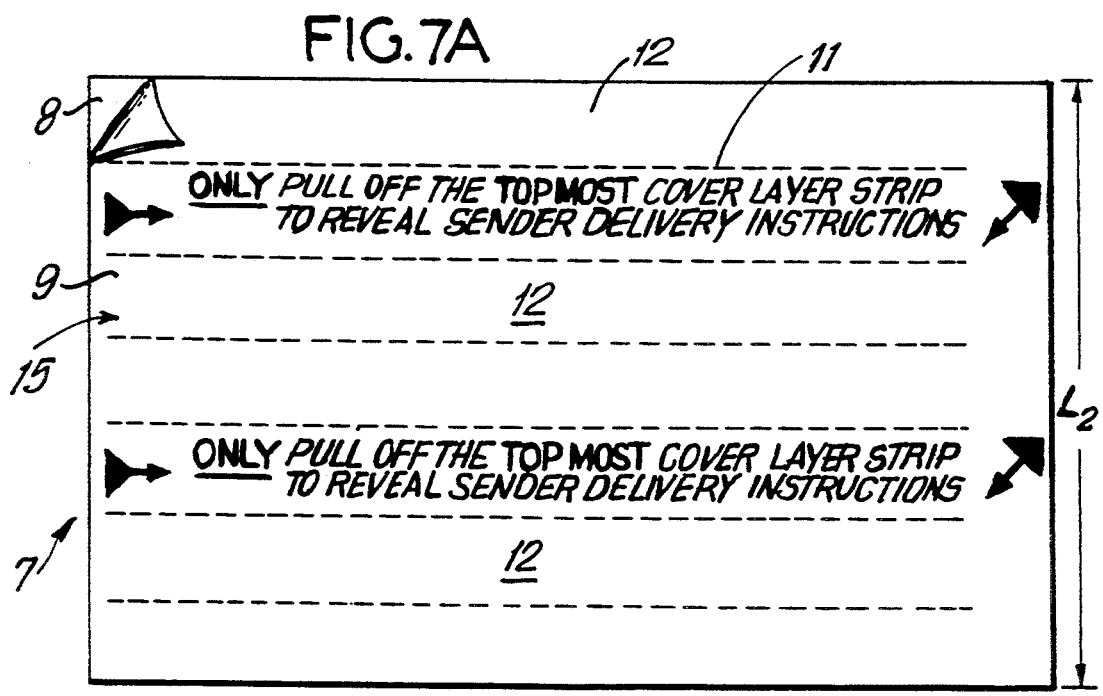

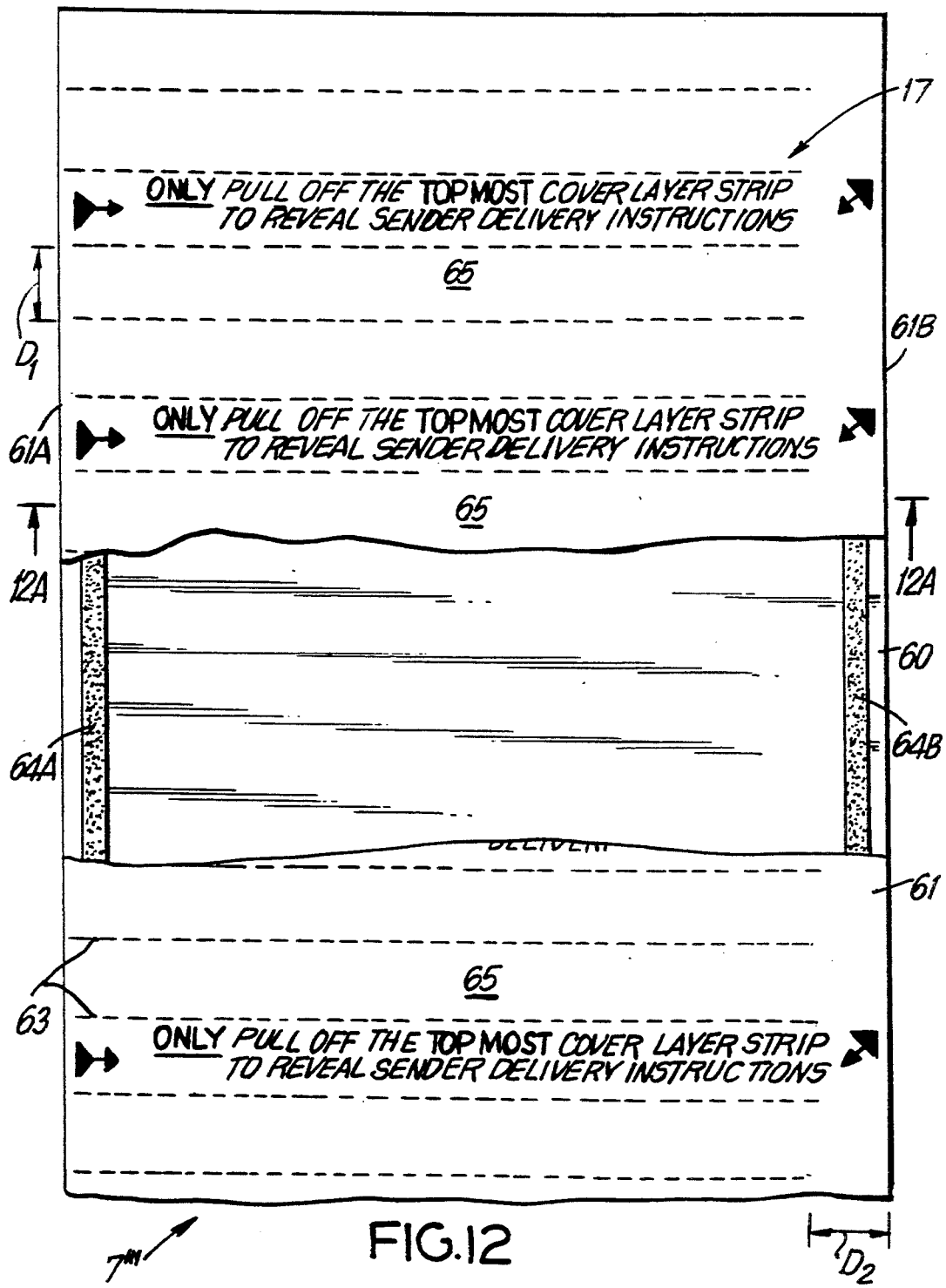
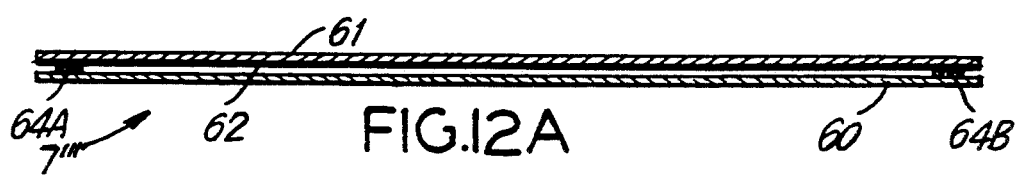
FIG.12
FIG.12A

COMPOSITE RECORDING MATERIALS, FACSIMILE INSTRUCTION LABELS AND METHOD OF DELIVERING HARD COPIES OF CONFIDENTIAL MESSAGES USING THE SAME

BACKGROUND OF THE INVENTION

1. Field of Invention

The present invention relates to a method and apparatus for transmitting and delivering a confidential message or document by way of a conventional facsimile data transmission system in a manner which prevents the casual observer from reading the contents of the received facsimile without producing visible evidence of tampering.

2. Brief Description of the Prior Art

Over the centuries, written communication has become essential to conducting both business and personal affairs. As the subject matter of these communications became increasingly private in nature, there arose a problem regarding their confidential transmission. Short of folding, sealing or encapsulating the message in a sealed tube for delivery, the integrity of those involved in the transmission and delivery of the message was relied upon for preserving confidentiality. A natural solution to this problem was provided in large part by the envelope. To date, the envelope, in its numerous embodiments, is the method of choice to ensure confidentiality through the delivery process.

With the advent of telegraphy, telegraphic messages, such as telegrams, an additional technique of message transmission was established. However, the need for preserving confidentiality rendered this communication technique less than desirable. In response to this problem, U.S. Pat. No. 2,396,833 to D'Humy discloses a telegraph receiving blank adapted to conceal the body of the recorded message, thereby preventing unauthorized access during handling and delivery.

In the decades following the developing of the above-mentioned telegraph receiving blank, a variety of facsimile machines have been developed which incorporate printers utilizing thermally sensitive paper. Machines of this type are generally adapted to receive and print messages of varying length and thereafter automatically cut the thermally sensitive paper at the end of the message.

As with previous technology involving written communication, present day facsimile machines have not been without concern regarding confidentiality. However, prior art recording blanks of predetermined length have been incapable of safeguarding confidentiality since, unlike prior telegraph equipment, modern day facsimile machines often sever the paper at the end of the recorded message, thereby resulting in documents of varying length. Consequently, the continuous strip of facsimile printing medium proposed in U.S. Pat. No. 3,396,833, cannot be successfully utilized with thermal printing facsimile machines since the severing operation, occurring at arbitrary points along the continuous strip, frequently severs the sealed blank along the message recording area, rendering it impossible to ensure that intended address information is obtained without revealing confidential information. Similarly, the rolls of printing medium disclosed in U.S. Pat. No. 5,001,749 also cannot be successfully utilized with the thermal printing facsimile machines since, with arbitrary length cutting, it is not possible to ascertain intended addressee information without revealing confidential information.

Although attempts at securing confidentiality in facsimile transmissions through the use of specialized recording blanks and material have been virtually unsuccessful to date in thermal facsimile printers, alternative techniques do ensure some measure of confidentiality.

U.S. Pat. No. 4,876,355 discloses one such technique in which a patterning device in conjunction with a photocopy machine is used to produce two partial documents. These partial documents are then transmitted by a facsimile system, and subsequently registered at the receiver to reconstruct the original document. While this technique prevents unauthorized casual reading of each partial document at the transmitter, the received partial documents can be easily registered by unauthorized personnel for document reconstruction without leaving any evidence that unauthorized access had occurred.

Another technique for securing facsimile transmissions has been through the use of facsimile machines having "electronic mailbox" capabilities. In such systems, confidential messages destined for a particular individual are not printed upon receipt, rather they are stored in an assigned electronic mailbox or memory location within the facsimile machine. When the individual desires to read his or her mail, an assigned access or security code is inserted, whereupon the stored messages are printed. While this technique can provide a certain degree of confidentiality, it requires special equipment and necessitates that the recipient or an authorized agent access it from the facsimile machine.

Thus, while several approaches have been proposed for preventing casual reading of confidential messages, such techniques have suffered from shortcomings and drawbacks of the type described above.

As a result, there remains a need for an alternative approach in delivering hard-copy facsimiles containing confidential information in a manner which prevents causal reading of the contents of the confidential document, and overcomes the shortcomings and drawbacks associated with the use of prior art composite recording medium in conventional thermal printing facsimile equipment having arbitrary sheet length cutting capabilities.

Accordingly, it is a primary object of the present invention to provide flexible composite material and a method of delivering hard-copies of confidential messages in a manner which overcomes the shortcomings and drawbacks of prior art methodologies and apparatus.

It is a further object of the present invention to provide such flexible composites for use in conjunction with a conventional facsimile data transmission systems.

It is a further object of the present invention to provide such a method, facsimile instruction labels and composite recording material, in which confidential messages of any length, can be electronically transmitted and subsequently printed as a hard-copy facsimile which permits delivery to the intended addressee without revealing its confidential content.

Still a further object of the present invention is to provide such a method and apparatus, in which confidential documents are formatted so that a non-confidential portion of the facsimile message is simply rendered visible for reading sender delivery instructions, while the confidential message portion is concealed in a manner that would provide visual evidence of tampering.

SUMMARY OF INVENTION

According to one aspect of the present invention, there is provided flexible composite recording material upon which a facsimile message containing both confidential and non-confidential information can be recorded. In general, the composite recording comprises a recording sheet and a cover sheet. The recording sheet has a predetermined width and a longitudinal extent which varies in length consistent with the length of the recorded message. The cover layer is disposed over the recording sheet to conceal a confidential message recording area and non-confidential message recording area defined by the facsimile sender.

The cover sheet has a plurality of transverse perforation lines formed along the longitudinal extent of the cover sheet. The transverse perforation lines are spaced apart in a parallel fashion. Each pair of adjacent perforation lines forms a cover sheet strip that can be selectively removed. In order to instruct the receiving station attendant how to reveal at least a portion of the non-confidential recording area without revealing the contents of the confidential message, one or more of the cover sheet strips bear preprinted instructions. Preferably, a releasable adhesive sheet or pattern is disposed between the cover sheet and the recording sheet so as to releasably secure the same together without adversely effecting the integrity or functioning of the facsimile message recording area.

According to another aspect of the present invention, an inventory of preprinted instruction labels is provided. Each preprinted instruction label has an adhesive backing for application to original confidential documents to be electronically transmitted from a facsimile transmitter to a facsimile receiver. In the preferred embodiment, each sender-instruction label is capable of carrying a variety of information relating to the intended addressee, the sender, the number of pages in the facsimile document, and the like. When the received facsimile is recorded on composite recording material of the present invention, a facsimile image of the preprinted label appears beneath one or more preselected cover sheet strips, which can be simply removed at the facsimile receiver by following preprinted instructions on the cover sheet. Advantageously, these facsimile instruction labels when used in connection with composite recording material of the present invention, ensure reliable recovery of addressee and delivery information without risk of inadvertently exposing the confidential contents of the hard copy confidential facsimile document. Also, the use of these instruction labels eliminate the need for conventional cover sheets employed in confidential facsimile communications.

According to another aspect of the present invention there is provided a method of delivering a hard copy of a confidential message. The method involves utilization of a facsimile data communication system including at least one transmitter and at least one receiver operably associated with a recording means capable of utilizing the flexible composite recording materials of the present invention.

In general, the method of the invention involves providing a confidential message from the sender, for delivery to the receiver. The method includes formatting the confidential and non-confidential portions of the message within a message formatting space having both confidential and non-confidential format portions, each of which extend along both the horizontal and longitudinal dimensions of the message formatting space. Preferably, a facsimile instruction label of the present invention is used to quickly format the confidential message, although other disclosed techniques can be employed. In this regard, it is generally noted that the sender-definable confidential message recording area on the composite recording layer corresponds substantially to the confidential message formatting space, and the sender-definable non-confidential message recording area to the composite recording sheet corresponds to the non-confidential message formatting space.

After formatting, the message is transmitted and upon receipt, the facsimile message is recorded upon the recording area of the composite recording material of the present invention. Then, by simply removing a cover sheet strip identified by the preprinted receiver instructions on the cover sheet, a facsimile image of the preprinted instruction label is revealed, while preserving the confidentiality of the sender's message. By reading this facsimile instruction label and carrying out its instructions, confidential delivery of the sender's message to the intended receiver is achieved.

DETAILED DESCRIPTION OF THE DRAWINGS

For a further understanding of the objects of the present invention, the detailed description of the illustrated embodiment is to be taken in connection with the following drawings, in which:

FIG. 5A is a plan view of a sheet of preprinted adhesive-backed, sender-instruction labels for use with the composite recording medium of the present invention;

FIG. 5B is a perspective view of preprinted adhesive-backed facsimile sender-instruction labels stored in a carton-type dispenser;

Figure 6A:
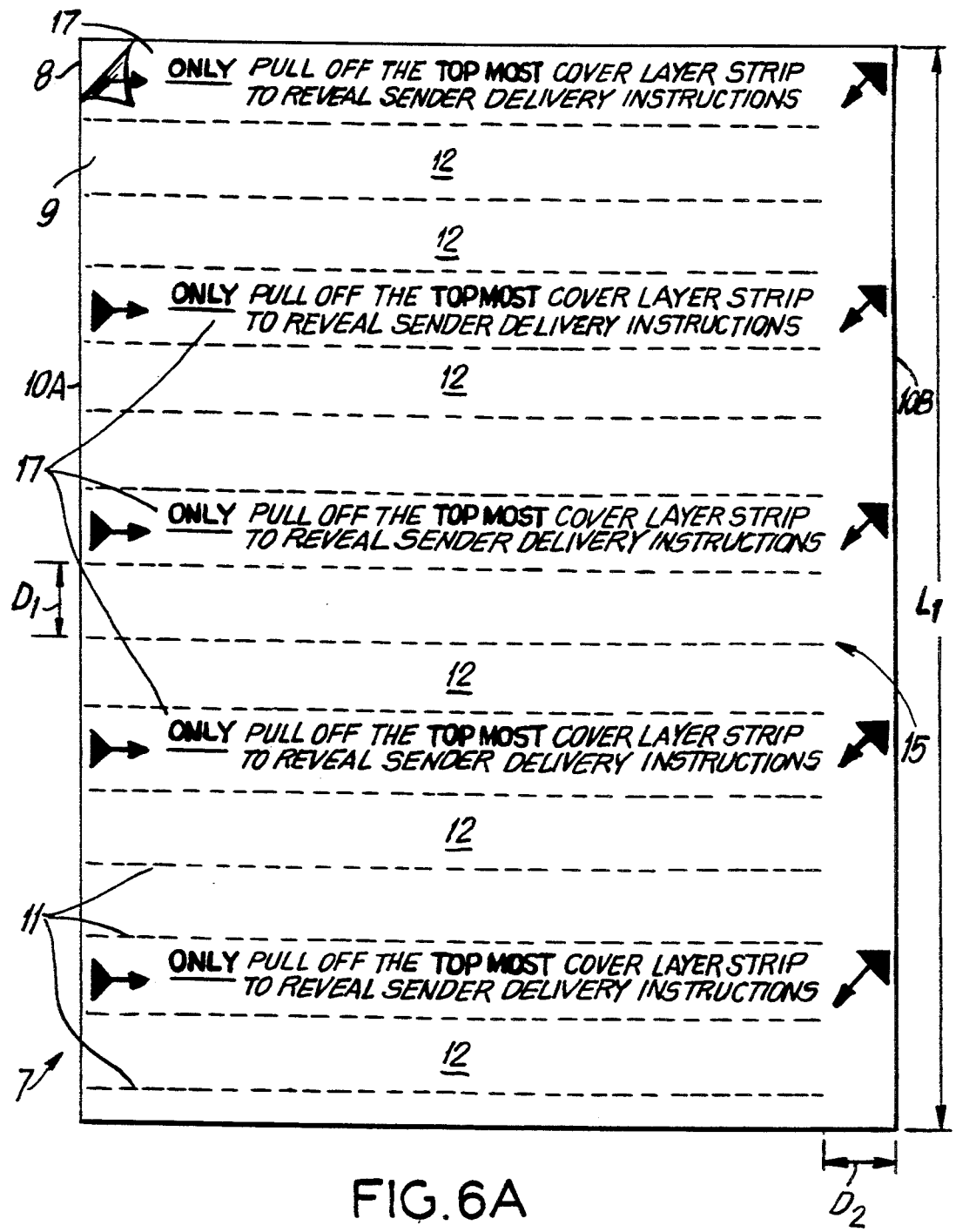
FIG. 6A is plan view of a transversely severed sheet of flexible composite recording material in accordance with the present invention having a length $L_1$ sufficient for recording a standard 8½×11 inch letter.
Figure 6B:
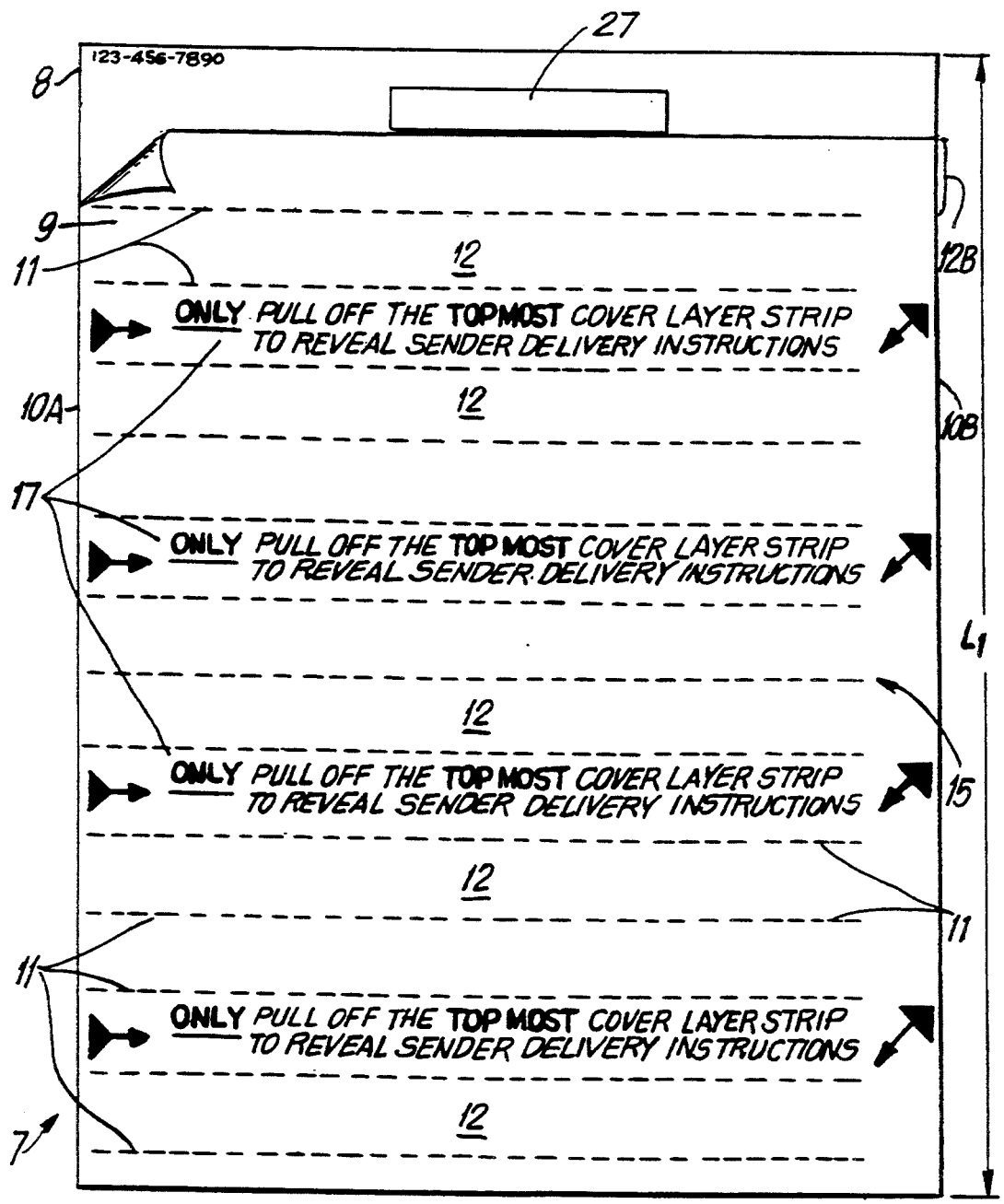
Figure 8:
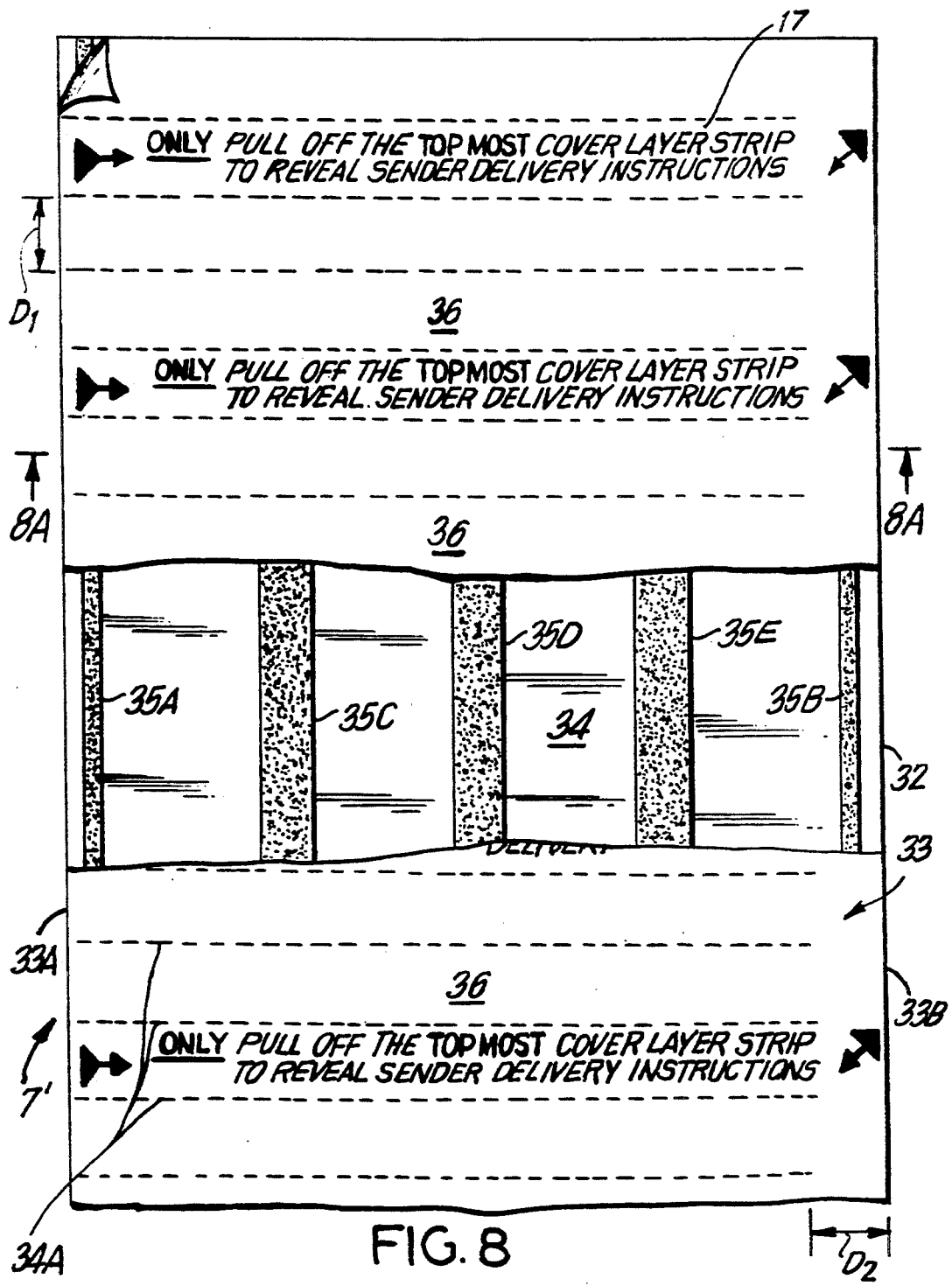
Figure 8A:
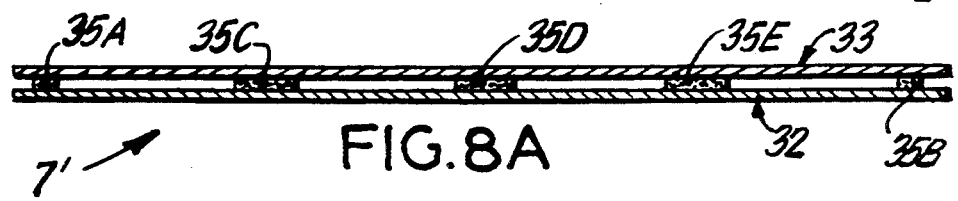
Figure 9:
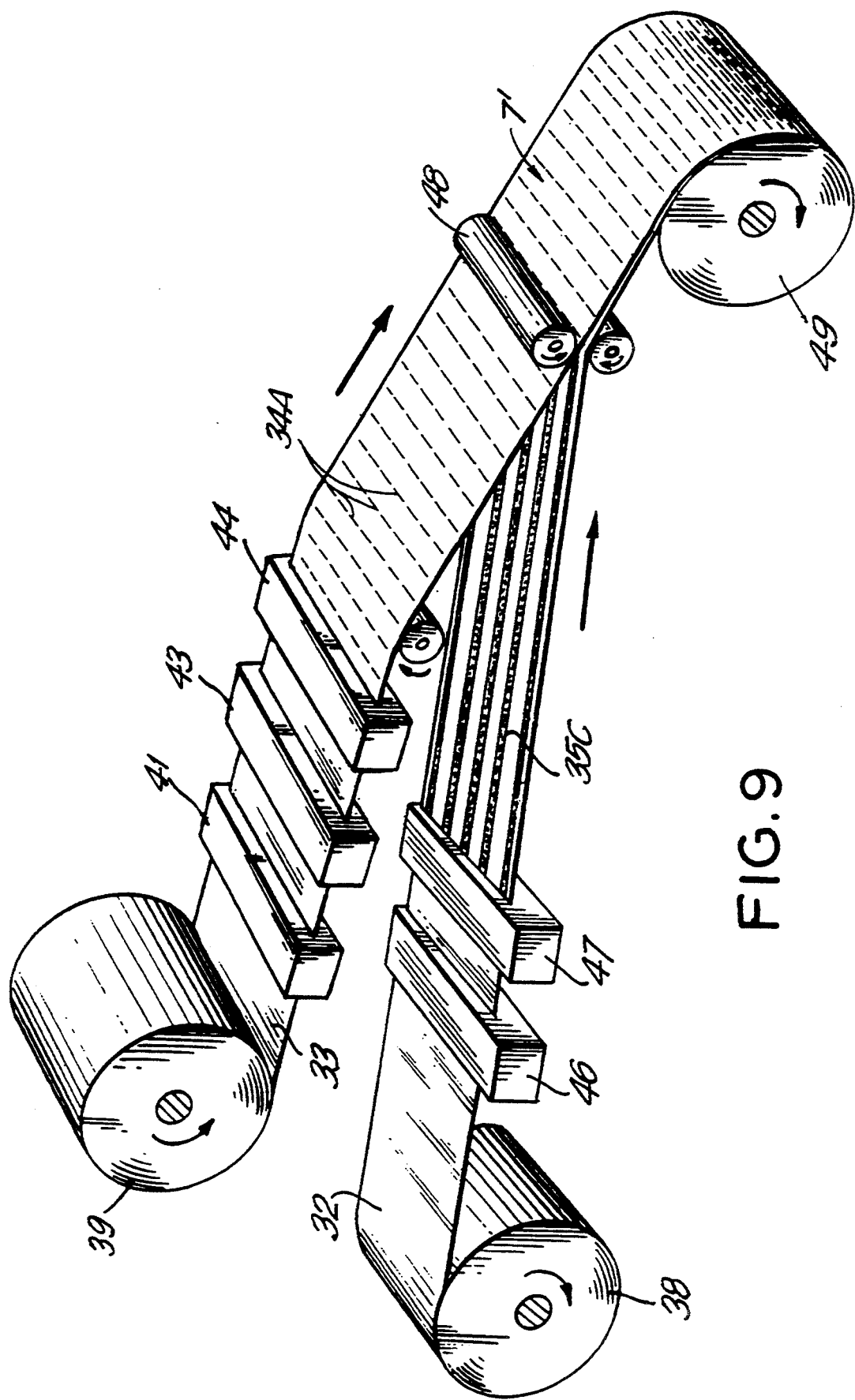
Figure 9A:
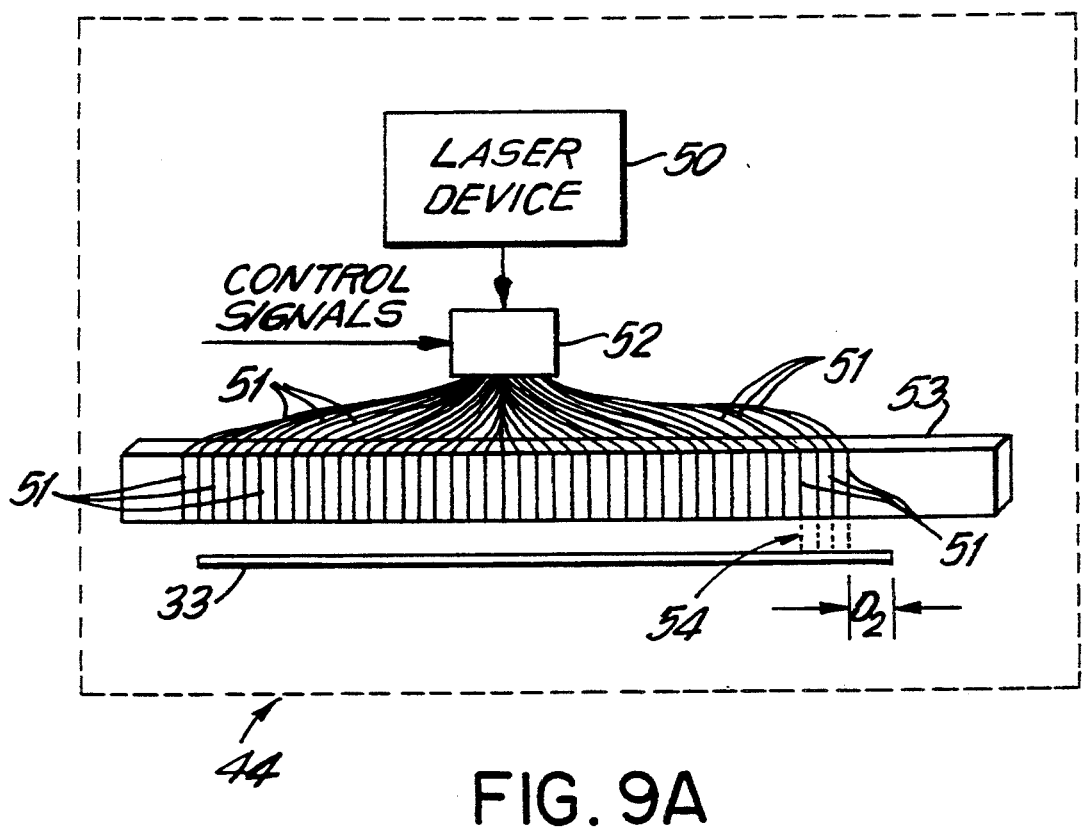
Figure 10:
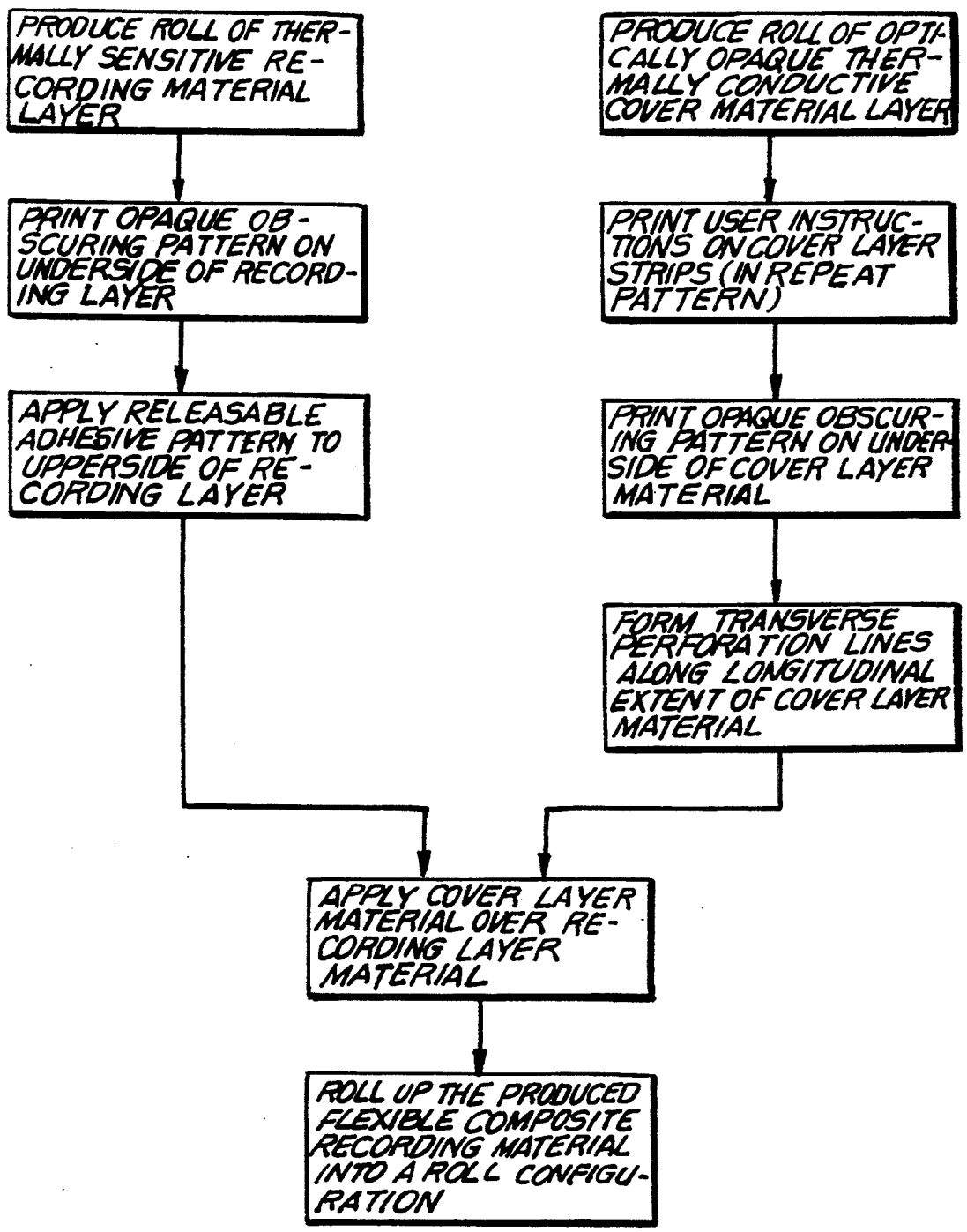
Figure 11:
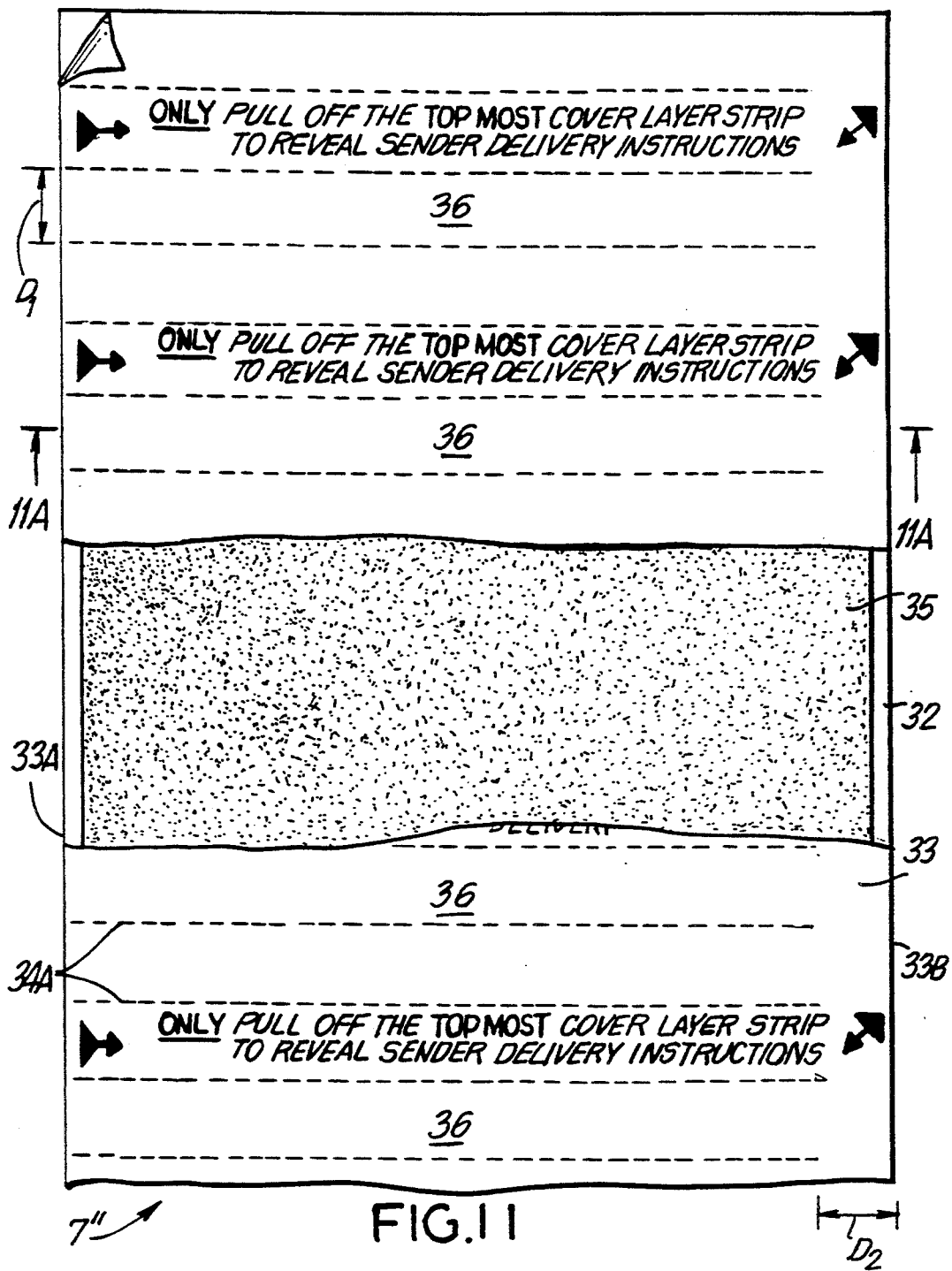
Figure 11A:
Figure 13:
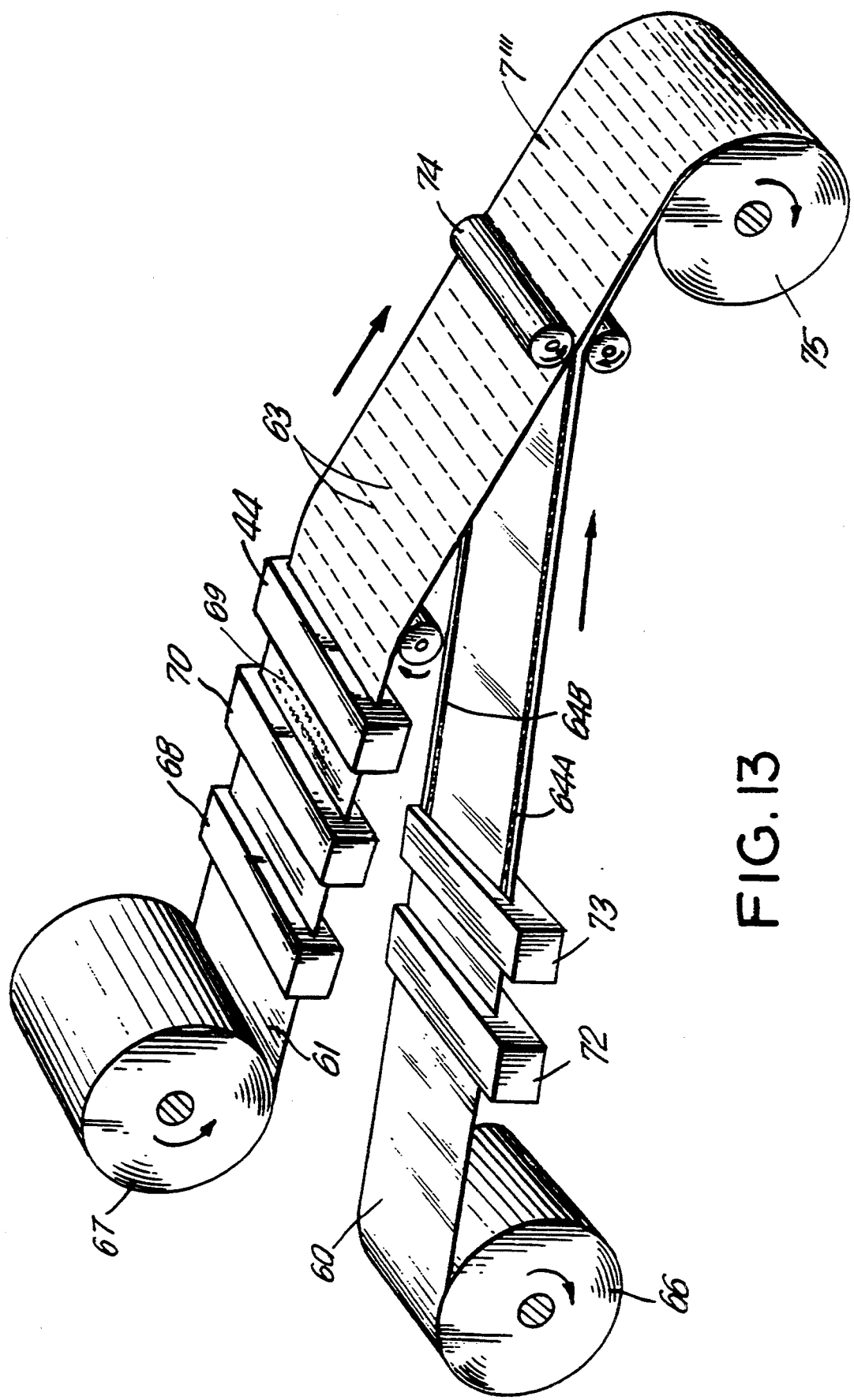

FIG. 6B with the uppermost cover layer strip removed, revealing the facsimile image of a preprinted sender-instruction label of the present/invention;

FIG. 6C is a plan view of the composite recording sheet shown in FIGS. 6A and 6B, in which a plurality of integrally connected cover sheet strips are partially peeled away from the sender-defined confidential message recording area;

FIG. 7A is a plan view of a transversely severed sheet of flexible composite recording material in accordance with the present invention, having a shorter length especially suited for reproducing confidential facsimile billing statements, report documents and the like;

FIG. 7B is a plan view of the composite recording sheet shown in FIG. 7A, in which the first uppermost cover sheet strip has been removed to reveal the facsimile image of a preprinted sender-instruction label of the present invention, bearing delivery instructions for execution at the facsimile receiving station;

FIG. 7C is a plan view of the composite recording sheet shown in FIGS. 7A and 7B, in which a plurality of integrally connected cover sheet strips are partially peeled away from the sender-defined confidential message recording area;

FIG. 8 is a plan, partially broken away view of a portion of continuously formed, transversely severed composite recording material constructed in accordance with the first embodiment of the present invention;

FIG. 8A is a cross-sectional view of the flexible composite recording material of FIG. 8, taken along line 8A—8A;

FIG. 9 is a schematic representation of a process utilized in making the flexible composite recording material according to the first embodiment of the present invention;

FIG. 9A is a schematic illustration of apparatus used in forming transverse perforation lines in the composite recording material manufacturing processes of FIGS. 9 and 13;

FIG. 10 is a block diagram illustrating a process for manufacturing the first embodiment of the composite recording material illustrated in FIGS. 8 and 8A;

FIG. 11 is a plan, partially broken away view of a portion of continuously formed, transversely severed composite recording material constructed in accordance with the second embodiment of the present invention;

FIG. 11A is a cross-sectional view of flexible composite recording material of FIG. 11, taken along line 11A—11A;

FIG. 12 is a plan, partially broken away view of a portion of continuously formed, transversely severed composite recording material constructed in accordance with the third embodiment of the present invention;

FIG. 12A is a cross-sectional view of the flexible composite recording material of FIG. 12, taken along 12A—12A; and FIG. 13 is schematic representation of a process utilized in making the flexible composite recording material according to the third embodiment of the present invention.

DETAILED DESCRIPTION OF THE PREFERRED EMBODIMENTS

Referring now to the drawings wherein like reference numbers designate similar parts through the various views, attention is first directed to FIGS. 1 through 6C wherein the method of delivering a confidential hard-copy facsimile according to the present invention, is described.

Figure 2:
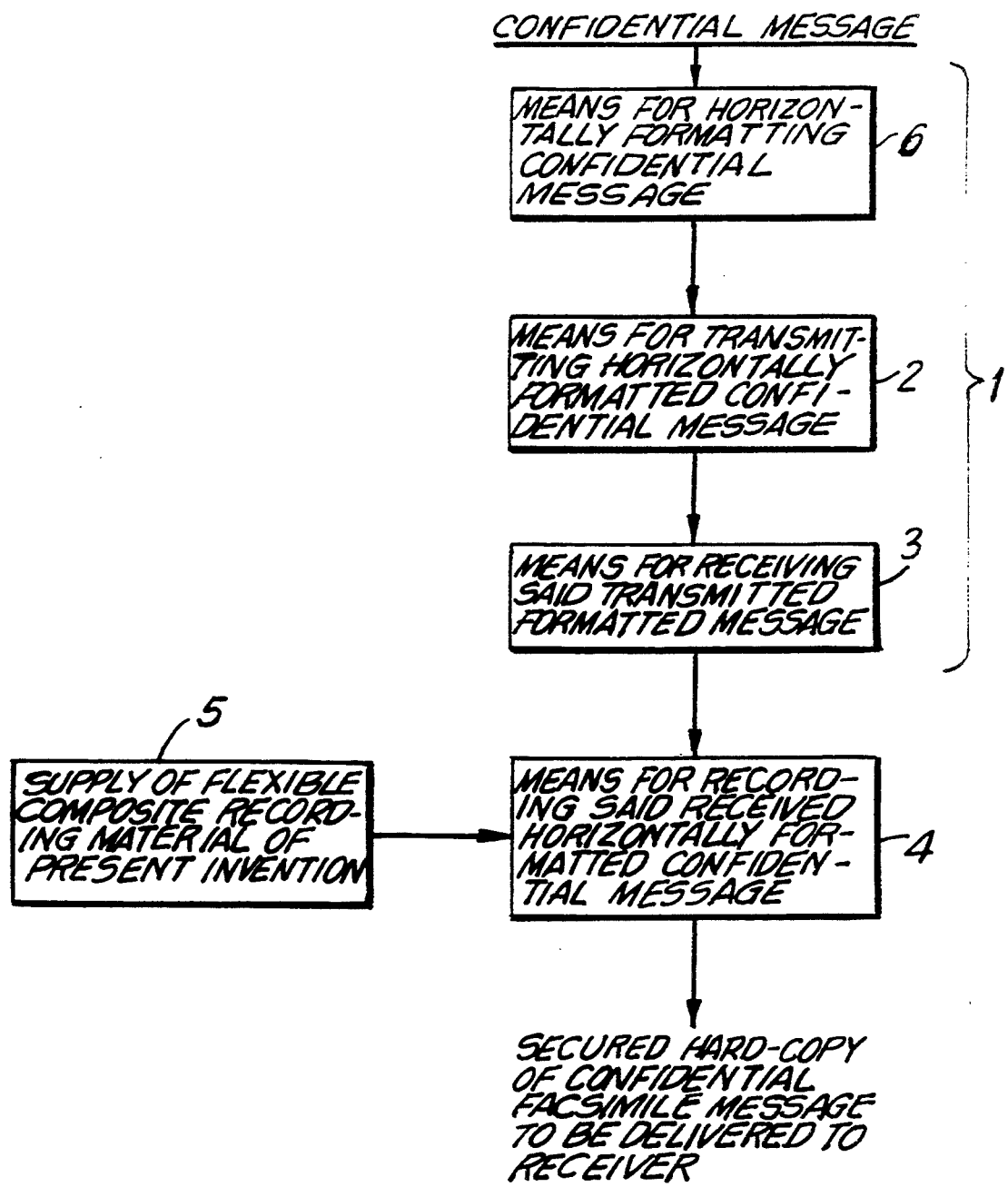
FIG. 2 is a flow chart illustrating the apparatus functions used to carry out the method of hard-copy confidential message delivery in accordance with the present invention.

In general, the method involves the use of a conventional facsimile data communication system 1 illustrated in FIG. 2. As shown, facsimile data communication system 1 includes at least one transmitter 2, and at least one receiver 3, both of which are provided with separate transmission, reception and message recording capabilities. It is noted that although the invention is disclosed and discussed in the context of the above-described system, other forms of communication systems can be used. For example, transmitter 2 may be a personal computer provided with a facsimile modem in a manner well known in the art. Receiver 3 may also be a personal computer system equipped with an appropriate modem and external printer. Similarly, while the facsimile machines utilized by the present invention have been illustrated as having thermal printing mechanisms 4, it is understood that any recording mechanism, known in the art, may be used.

Figure 1:
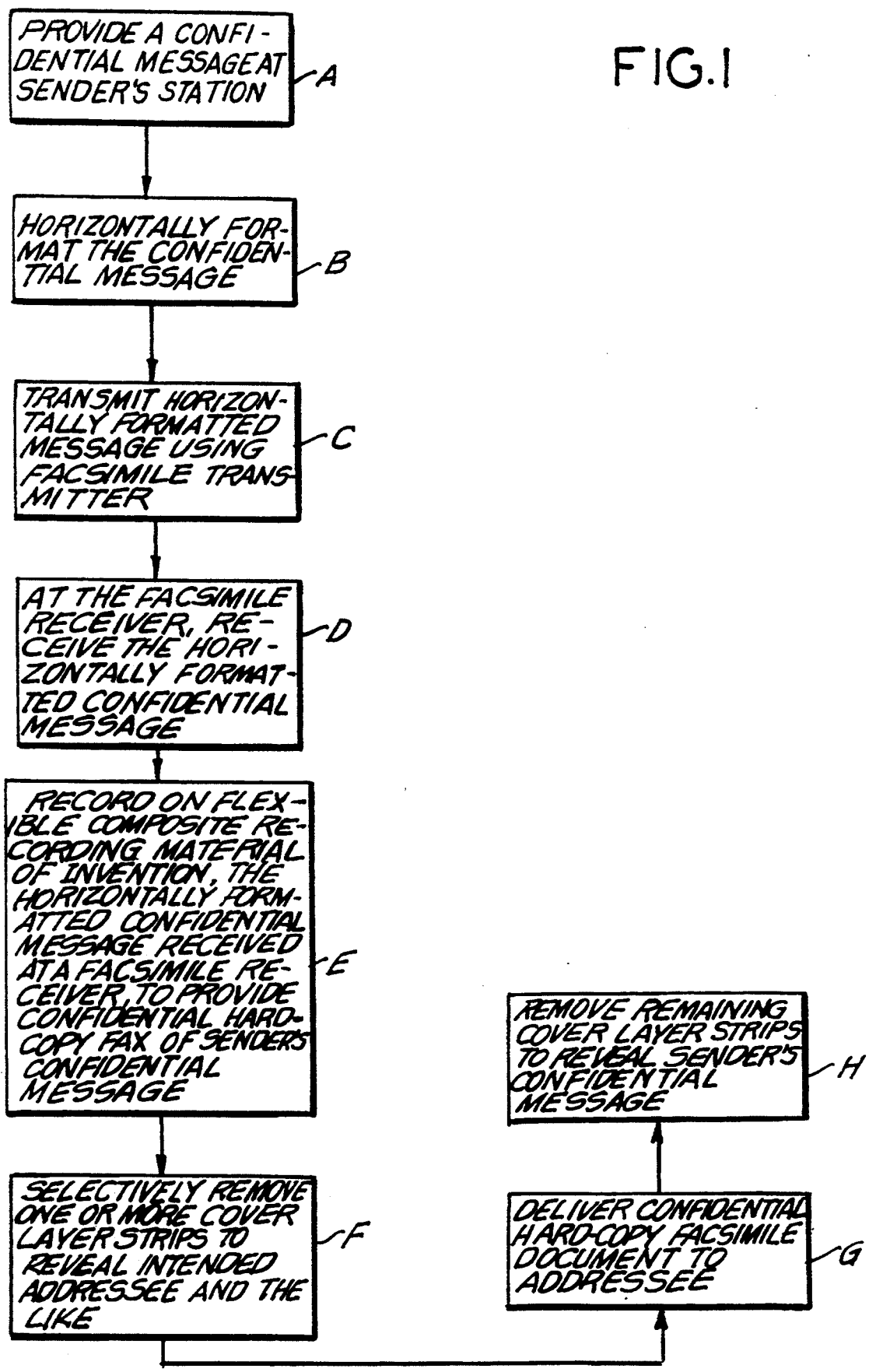
FIG. 1 is a block diagram illustrating the various steps comprising the method of hard-copy confidential message delivery in accordance with the present invention.

As indicated at Block A of FIG. 1, the first step of the method involves producing a confidential message or document, which in general includes a confidential message portion and a non-confidential message portion. As used herein, the term "confidential message portion" encompasses any printed or graphic subject matter which the sender considers private, privileged or confidential and which is intended for the eyes of only the receiver or his authorized agent. The term "non-confidential message portion" includes any item of information which is not considered confidential or privileged and by way of example may include the name or address of the sender or recipient with appropriate delivery instructions. Both the confidential and non-confidential portions of the message can be represented by a physical writing, or electronically in those instances where the message is stored in memory for display by a conventional computer system.

As indicated at Block B of FIG. 1, the next step of the method involves horizontally formatting the message (i.e. confidential document) to ensure that when the message is transmitted and recorded, the confidential message portion can be maintained concealed while the non-confidential portion is selectively revealable for identifying the addressee, delivery instructions and the like. However, to appreciate the importance of this step, the general nature of the composite recording material to be utilized in the method, must be first understood.

As shown in FIG. 6A, a sheet of composite recording material 7 of the present invention, is cut to length $L_1$ by the facsimile printer after recording the entire received facsimile message. This length $L_1$ will vary in measure consistent with the length of the recorded message. As will be illustrated hereinafter, messages of any length can be confidentially recorded using the method and composite recording materials of the present invention; the width of the composite recording material 7, however, will remain constant and typically be the industry standard of 8½ inches. As shown, composite recording sheet 7 comprises a recording layer 8, over which an optically opaque cover sheet 9 is secured at its parallel extending edges 10A and 10B. As used hereinafter and in the claims, the term "opaque" shall be deemed to mean sufficiently invisible or otherwise appearing obscured to human beings so that intelligence cannot be gleaned from graphical information lying beneath the cover sheet.

As shown, cover layer 9 has a plurality of transversely disposed perforation lines 11 spaced apart in parallel fashion along the longitudinal extent of the recording sheet. Each adjacent pair of perforation lines defines a rectangularly shaped cover sheet strip 12 which can be selectively removed at the facsimile receiver, to reveal a corresponding portion of the recording layer having a surface area substantially equal in exposure to the surface area of the removed cover sheet strip. As shown, the distance between adjacent perforation lines is indicated by $D_1$, which in the illustrated embodiment is about 1.0 inch. Starting from the upper most edge of the composite recording sheet, one or more consecutively arranged cover sheet strips are capable of concealing a sender-defined non-confidential recording area, generally bounded by boundary line 13 in FIG. 6C for illustration purposes only. As will be explained in greater detail hereinafter, these cover sheet strips are sufficiently thermally transmissive to permit recording of facsimile message upon the recording sheet. Additionally, a plurality of consecutively arranged cover sheet strips, immediately below those defining the non-confidential message recording area, are capable of concealing a sender-defined confidential message recording area, generally bounded by boundary line 14 in FIG. 6A for illustration purposes only.

As illustrated in FIGS. 6A and 6B, each cover sheet strip can simply be removed by pulling up upon its left most edge 12A and pulling it horizontally across the composite recording sheet. However, to enable the facsimile receiver (i.e. intended addressee) to simply reveal the confidential message, each perforation line 11 is terminated at a predetermined distance $D_2$ from the right side edge 12B of the cover layer strips. Since all cover sheet strips are integrally connected by the longitudinally extending cover sheet region 15 thusly formed, all that is required to remove these connected cover sheet strips in a single operation, is to pull the right upper corner edge 16 diagonally downward, as shown in FIG. 6C. As will be appreciated hereinafter, one of the major advantages of composite recording material 7 is that it eliminates message formatting errors characteristic of prior art composite recording materials.

Having described the general features of the composite recording material of the present invention, message formatting will now be described in detail. In this regard, there are several possible approaches to this step. Two such methods will be considered below.

Figure 3:
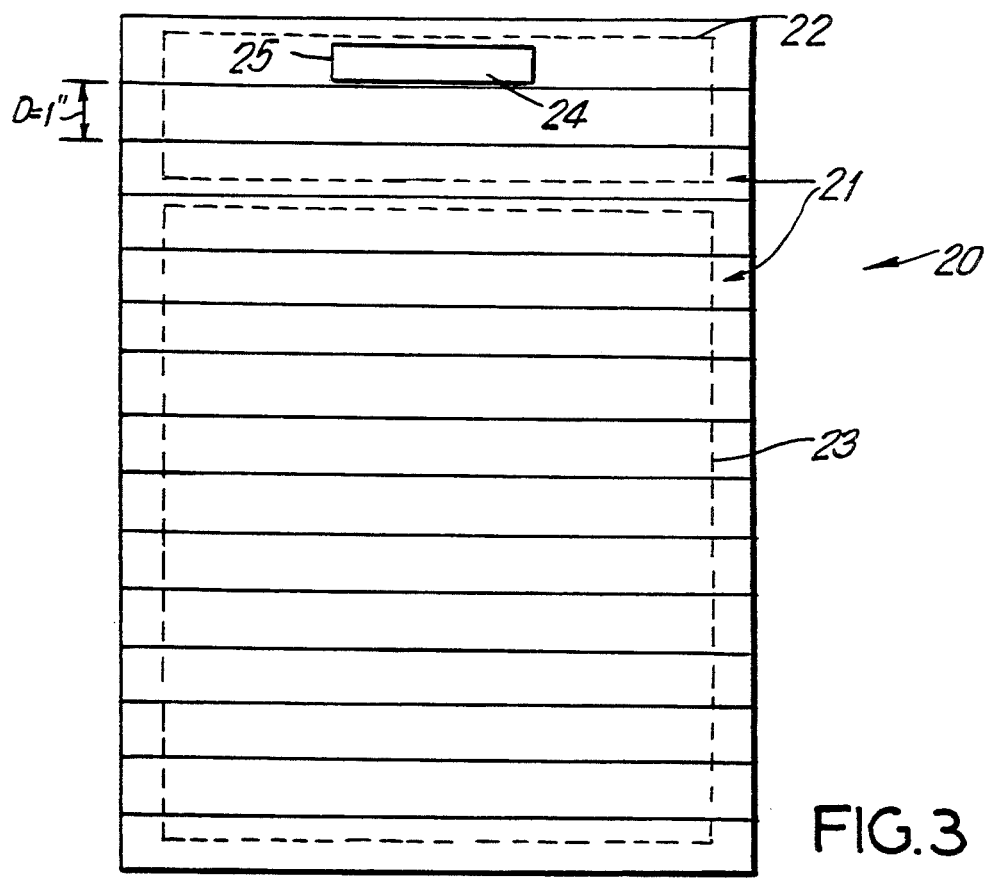
FIG. 3 is a schematic illustration of the message format space used to format the confidential message into a confidential message recording areas, according to the present invention.

Turning to FIG. 3, a first method is illustrated for horizontally formatting confidential messages for recording on composite material of the present invention. Message format space 20 utilized in formatting the confidential message, is shown schematically as a stacked array of rectangular formatting fields 21. Each formatting field 21 corresponds in area with a cover layer strip 12 on composite recording material 7 illustrated in FIGS. 6A through 6C. The message sender selects one or more of these rectangular formatting fields to represent a non-confidential message recording space 22, and a plurality of these rectangular formatting fields to represent a confidential message recording space 23. As shown, each such space extends both across and longitudinally along the extent of space 20. As with the length of the composite recording material, the longitudinal extent of message formatting space 20 will typically vary coincident to the length of the message being formatted, while the width of the formatting space will typically match the width of the composite recording material and therefore remain constant.

Message formatting space 20 can be represented in one of a variety of mediums, including, for example, a computer display memory, or a physical document. Preferably, the formatting space is programmed into the display memory of a conventional computer system 6 in FIG. 2, provided with word-processing capabilities. In this way, the confidential and non-confidential formatting spaces 22 and 23 can be visibly delineated using, for example, respective boundary lines generally shown in FIG. 3. With the imposition of such boundary lines, the extent of each message space is clear and all that the sender need do to assure proper formatting at the transmission end is to provide sender's delivery instructions in one or more of the rectangular formatting fields defined within the non-confidential formatting space 22 of the sender's facsimile message.

Preferably, although not necessarily, the sender's delivery instructions 24 are provided in the first (i.e. uppermost) formatting field 25, and if additional space is required, the formatting field immediately below the uppermost formatting field can be used, and so on, until the sender's delivery instructions are completely recorded within sender-defined non-confidential message space 22. In this way, when the facsimile document is transmitted, received and recorded at the facsimile receiver, the sender's complete delivery instructions will lie below the first cover sheet strip of each sheet of composite recording material. If the sender desires additional cover sheet strips to be removed, then instructions to do so can be printed in formatting field 25. Also, when the confidential message contains more than one sheet, then it is preferred that the uppermost formatting field of each sheet include sender's instructions 24 in order to create continuity between facsimile sheets of the same document, and prevent commingling with others.

Figure 4:
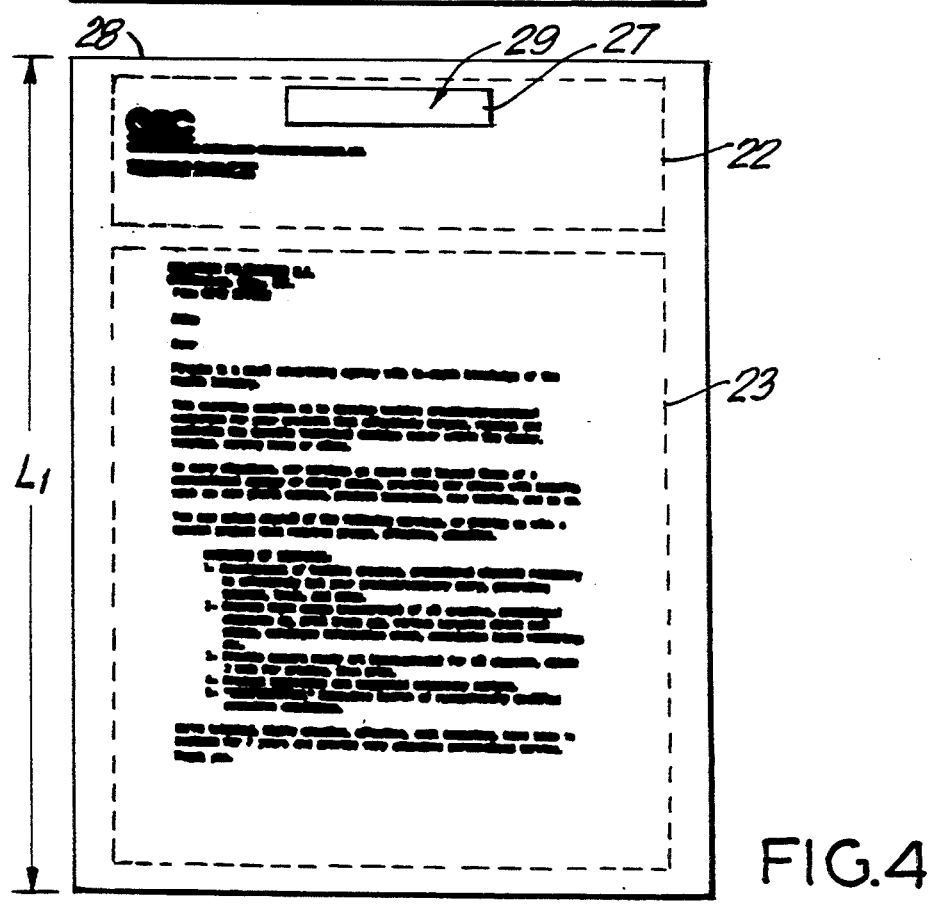
FIG. 4 is a plan view of a confidential document to which a preprinted instruction label of the present invention has been applied in order to convey the sender's instructions during the facsimile transmission process.

Turning to FIG. 4, a second method for horizontal formatting according to the present invention, is illustrated. As shown, a preprinted instruction label 27 is applied preferably along the upper edge portion of confidential document 28 to be transmitted to a facsimile receiver. Preferably, although not necessarily, placement of instruction label 27 is within the first (i.e. uppermost) rectangular formatting field, as defined in FIG. 3 and discussed above. In this way, the sender's instructions 29 preprinted on label 27 will always appear under the first (i.e. uppermost) cover sheet strip of the composite recording sheet material bearing the recorded confidential message. The facsimile receiver attendant then need only remove the uppermost cover sheet strip to reveal the complete delivery instructions of the sender.

Figure 5A:
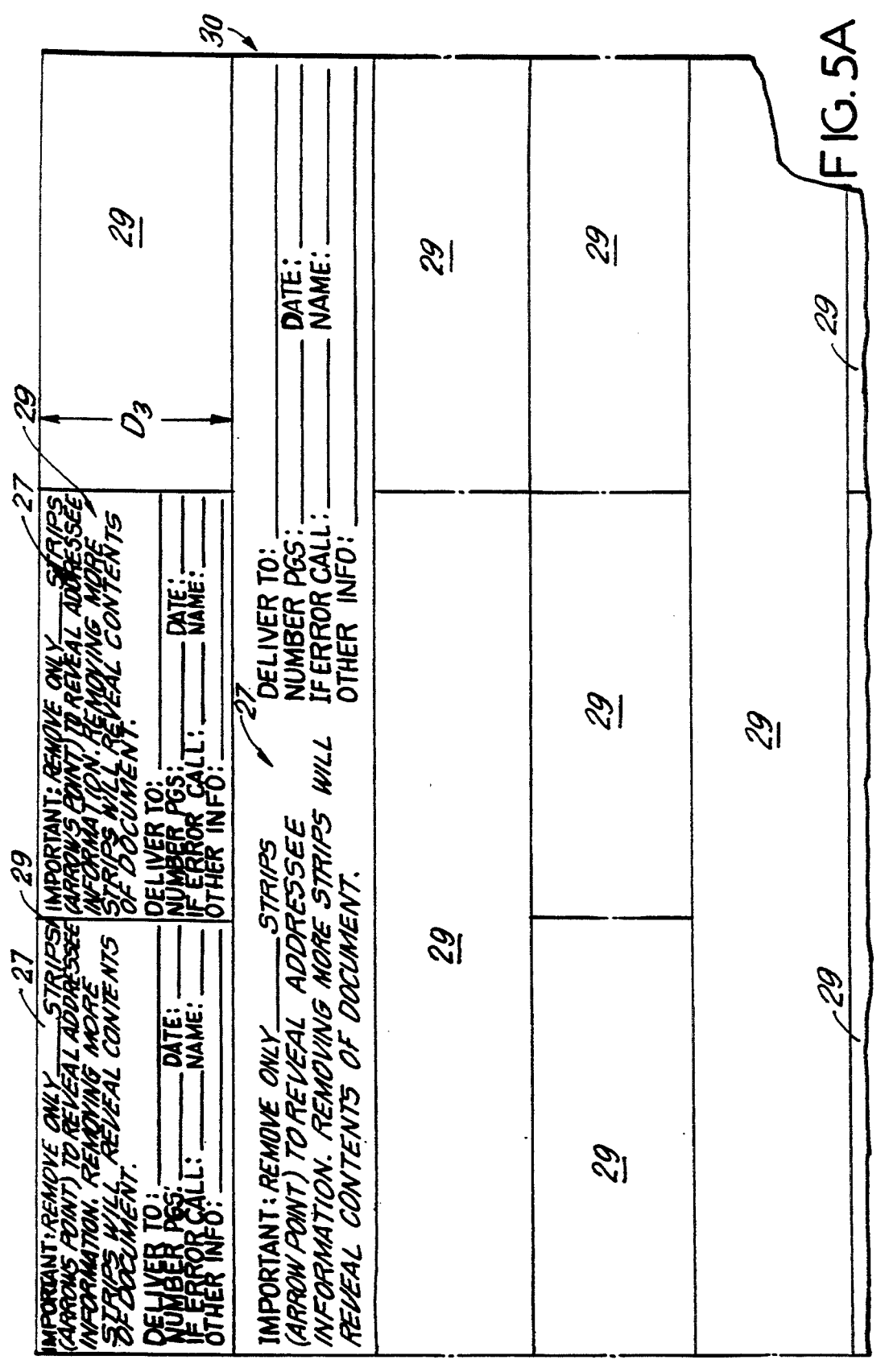

As illustrated in FIGS. 5A and 5B, respectively, an inventory of preprinted facsimile instruction labels 27 can be arranged either on a wax-coated carrier sheet 30, or on a wax-coated carrier strip 31 configured into a roll enclosed within a dispenser carton 32. In general, each label 27 comprises a substrate 27 having a front surface and a rear surface. An adhesive sheet is applied to the rear surface. Preferably, the adhesive is a releasable type which can adhere to a wax-like carrier sheet or strip, and be simply peeled off for dispensing when required or desired by a facsimile sender. In addition, use of releasable adhesive will permit removal of facsimile instruction labels from original documents, if required or desired, without causing damage thereto. Each label 27 also includes graphical indicia 29 on the front surface of the label substrate and is adapted to receive, by way of handwriting, typewriter or other means, information regarding: (i) the addressee of sender's confidential facsimile document; (ii) delivery instructions; (iii) additional cover strip removal operations; (iv) the total number of pages in facsimile message; (v) the phone number of sender's facsimile transmitter, and the like.

Preferably, the height $D_3$ of each label 27 is substantially uniform across its length and is substantially equal to the uniform height $D_1$ of each cover sheet strip 12 on composite recording material 7. In the illustrated embodiment, the height of each preprinted instruction label 27 and the height of each cover sheet strip 12 are each about 1.0 inch, but in other embodiments, these values can be greater or less than this selected value. Also, as shown in FIG. 5A, the length of instruction labels 27 can vary in size in order to accommodate the letterhead requirements of diverse sender stationary. In the illustrated embodiment of FIG. 5A, three label sizes are shown.

As indicated at Blocks C and D of FIG. 1, after formatting the confidential message, the message is transmitted. In conventional systems, the transmission and reception process generally involves scanning the confidential message and producing an encoded data stream, transmitting this encoded data stream over the data communication channel, and receiving the transmitted encoded data stream at the receiver's facsimile machine.

As indicated at Block E of FIG. 1, the received data stream is subsequently stored or utilized immediately to print (i.e., record) a hard-copy facsimile of the transmitted message, using an appropriate length of composite recording material. As discussed above, the composite recording material is typically severed at the end of the received transmission printout for each original sheet being transmitted. The hard-copy facsimile produced at the receiving facsimile machine can be then manipulated according to the following procedure to ascertain the intended receiver (i.e., addressee).

First, the receiver station attendant reads the cover strip removal instructions 17 preprinted on the cover sheet, as shown in FIG. 6A. As illustrated, these instructions request the receiving station attendant to only remove the uppermost cover layer strip in order to reveal complete sender-instructions. Then as indicated at Block F, the receiving station attendant selectively removes the uppermost cover sheet strip. As illustrated in FIG. 6B, this is achieved by first pulling upwardly on left side edge 12A of the uppermost cover sheet strip completely and then pulling it horizontally across the composite recording sheet. Notably, the revealed facsimile image of the sender's instructions can be formed by applying such instructions either as an integral part of the confidential message as in FIG. 3, or as a preprinted sender-instruction label 27 as in FIG. 4. In the example shown in FIG. 6B, sender instructions are taken to have requested further removal of two (2) additional cover sheet strips, immediately below the uppermost cover layer strip. In such instances, the revealed non-confidential message recording area will have been deemed by the sender to include such revealed areas of the original document or message transmitted.

As indicated at Block G, the composite recording sheet is then delivered to its intended receiver. Thereafter, as indicated at Block H, when in possession of the intended receiver, the plurality of opaque cover layer strips concealing the confidential message, can be simply removed to reveal the confidential message with the confidence that it has not been previously accessed by unauthorized personnel. As shown in FIG. 6C, this can be achieved in a single operation by peeling upwardly along the right side edge corner 16, and then diagonally downward towards the left bottom corner of the composite recording sheet 7.

When transmitting more than one sheet in a confidential document, it is preferred that the following procedure is used. First, a preprinted sender instruction label 27 is affixed to the uppermost top edge of each sheet comprising the original confidential message. Then, information solicited on each label is printed in. Such information would include, for example, the name of the intended receiver (i.e. addressee); the name and phone number of the sender; the number of sheets in the confidential message; and the sheet number assigned to each document sheet. Thereafter, the confidential message is transmitted, received and subsequently recorded on a number of transversely cut sheets of composite recording material 7. At the receiver station, the station attendant will then remove the uppermost cover sheet strip on each produced composite recording sheet, as directed by preprinted instructions 17. In this way, facsimile images of each sender-instruction label 27 will be revealed so that the attendant can collate and staple together all sheets belonging to a particular facsimile document. Thereafter, these collated and stapled composite sheets can be delivered to its intended receiver without according anyone access to its confidential contents. This technique is particularly advantageous in several respects. For example, it prevents inadvertent commingling of facsimile sheets intended for one party, with those intended for another. Also, it facilitates orderly arrangement of multi-sheet confidential documents.

As illustrated in FIGS. 7A through 7C, the above-described method can be carried out to electronically deliver hard-copy confidential facsimile documents of any length and under diverse operating conditions.

For example, in FIG. 7A, a sheet of composite recording material 7 is shown transversely cut to a length $L_2$ substantially shorter than length $L_1$. This size facsimile document is particularly ideal for confidential messages such as, for example, billing statements, medical reports, laboratory reports, and the like. However, given the variety of confidential documents transmitted by facsimile transmission, the length of composite recording material of the present invention can be severed to any length without frustration of its operability. In this regard, reference is made to FIGS. 7A through 7C in which a particular situation is considered, namely, when the uppermost cover sheet strip has been transversely severed to half of its height during the transverse severing operation of a previous facsimile recording operation. In such a situation, the receiver station attendant will remove the partially-severed, uppermost cover sheet strip as illustrated in FIGS. 7A and 7B. Recognizing that only half of the instruction label image 27 is visible, the receiver station attendant will then simply remove the immediate cover sheet strip to reveal complete sender instructions. Thereafter, the hard-copy facsimile document is delivered to its addressee, and then opened as shown in FIG. 7C to reveal its confidential message.

Having described the method of delivering hard-copy facsimiles according to the present invention, it is appropriate at this juncture to describe various embodiments of the composite recording materials, with reference to FIGS. 8 through 13 of the drawings.

In FIG. 8 and 8A, a portion of continuously formed composite recording material 7' according to the first embodiment, is shown. Composite recording material 7' comprises a thermally sensitive recording layer 32 having a predetermined width (generally about 8.5 inches), and an optically opaque cover sheet 33 having a predetermined width of equal dimensions (generally about 8.5 inches). Cover sheet 33 is sufficiently thermally transmissive (i.e., conductive) to permit thermal printing of a confidential message upon recording area 34 of thermally sensitive layer 32.

As illustrated in FIGS. 8 and 8A, cover sheet 33 includes parallel extending side edges 33A and 33B and a plurality of transversely disposed perforation lines 34 spaced apart in parallel fashion along the longitudinal extent of cover sheet 33. Between each adjacent pair of perforation lines, a cover layer strip 36 is formed. As shown, each perforation line 34 terminates at a predetermined distance $D_2$ from the right side edge 33B of the cover sheet strips. As described hereinabove, this feature facilitates easy removal of a preselected number of cover strips in a single pulling operation.

In order to secure cover 33 layer and recording layer 32 without adversely effecting the facsimile message, a releasable adhesive layer 35 is disposed between at least a portion of the recording sheet and cover layer. As illustrated in FIGS. 8 and 8A, adhesive layer 35 is formed as a predetermined pattern of spaced-apart strips, 35A through 35E, preferably extending parallel to the opposing side edges of the cover sheet. To permit easy removal of selected cover sheet strips 36, recording layer 32 and the underside of each cover sheet strip, adjacent the left and right side edges thereof, are free of adhesive, as shown in FIGS. 8 and 8A. This is achieved by placing outer adhesive strips 35A and 35B at a predetermined distance from respective edges of cover sheet 33.

In FIGS. 9 and 10, a process for making continuous rolls of the composite recording material of FIGS. 8 and 8A, is illustrated. The first step includes producing a roll 38 of thermally sensitive recording layer material 32, such as thermal paper, in a conventional manner. The second step involves producing a roll 39 of thermally transmissive, optically opaque cover sheet material 33. In order that cover sheet material 33 is sufficiently thermally transmissive, metallic or functionally equivalent particles can be dispersed throughout cover sheet material 33 during manufacture. Also, the thermal sensitivity of recording sheet can be increased so that thermal patterns passing to the recording sheet, form clear, well-defined messages in the message recording area 34.

Having provided rolls 38 and 39, a number of other processing operations illustrated in FIGS. 9 and 10, are subsequently performed along the transport paths of material layers 32 and 33. In particular, at printing station 41, receiver instructions 17 are printed in a repeat pattern on the outer side of selected cover layer strips 36; at printing station 42, opaque obscuring (i.e. interference) patterns 43 can be printed in a continuous manner on the underside of cover sheet 33; and at perforation station 44, transverse perforation lines 34 are formed in cover sheet 33. Along the transport path of thermal recording sheet material 32, opaque obscuring (i.e. interference) patterns 45 can be printed in a continuous manner on the underside of recording layer 32, at printing station 46; and at adhesive application station 47, narrow parallel extending strips 35 of releasable adhesive are applied to the upper surface of thermal recording sheet 32. These processed sheets 32 and 33 are then brought into contact in an overlying relationship under pressure at station 48, so that cover sheet 33 is disposed over thermal recording sheet 32. As shown, this process results in the production of a continuous length of flexible composite recording material 7' which can be subsequently wound up into a roll configuration 49.

In FIG. 9A, perforation line forming station 44 is schematically illustrated. In general, station 44 comprises a laser device 50, a plurality of fiber optic cables 51, and an optical interface unit 52 which optically interfaces laser device output with one end of each of the fiber optic cables. Laser device 50 produces a pulsed laser beam which is delivered to optical interface unit 52, realizable as an optical multiplexer that is controllably switched by control signals, well known in the art. Optical interface unit 52, in turn, distributes the laser beam pulses to each of the fiber optic cables in a periodically switched manner. The opposing end of each fiber optic cable, on the other hand, is mounted through a fine hole formed in a mounting frame 53, to provide a linear arrangement of fiber optic cables. The support frame, in turn, is transversely mounted across the pathway of cover sheet material, shown in FIG. 9. Preferably, the laser device is capable of producing a pulsed laser beam having a wavelength which can photoablate selected cover sheet material (e.g. paper or plastic film). Also, the rate of switching is selected to be sufficiently fast in order to provide what appears as a simultaneous occurrence of a line laser light pulses 54 impinging transversely across the entire web of cover layer material passing under station 44 at an essentially constant speed. In this way, a transverse line of perforations spaced on the order of an inch apart, can be repeatedly formed in the cover layer material as it passes by the station at a high, but essentially constant speed.

To ensure that transverse perforation lines 34 are uniformly spaced apart along the longitudinal extent of cover sheet material, the control signals driving optical multiplexer 52 can be generated by a microcomputing device, whose input includes a signal representative of the instantaneous velocity of the cover layer material past perforation line forming station 44. This instantaneous velocity signal can be produced using a conventional velocity sensing device well known in the control instrumentation art. With this feedback arrangement, the rate at which a line of laser light pulses are delivered to cover sheet material 33, can be automatically adjusted to ensure transverse perforation lines 34 evenly spaced apart on order of an inch or so.

In FIGS. 11 and 11A, a portion of continuously formed composite recording material 7" according to the second embodiment of the present invention, is shown. In this embodiment, releasable adhesive layer 35 is a uniform layer applied between cover layer and recording layer 32. As shown, this thin uniformly applied adhesive layer terminates short of both left and right edges 33A and 33B of cover sheet 3 in order to provide each cover layer strip 36 with adhesive free side edges, as discussed in connection with the first embodiment. Preferably, releasable adhesive layer 35 is provided with thermally transmissive properties using techniques known in the art.

In FIGS. 12 and 12A, a portion of continuously formed composite recording material 7''' according to the third embodiment, is shown. Composite recording material 7''' comprises a plain-paper type recording sheet 60 having a predetermined width (generally about 8.5 inches), and an optically opaque cover sheet 61 having a predetermined width of equal dimensions (generally about 8.5 inches). Cover layer 61 is sufficiently thermally transmissive for transmission of heat patterns produced from a thermal printing head. Also, the underside of cover layer 61 bears a thermally transferable marking layer 62, such as, for example, a coating of heat-meltable (wax-based) ink. In this way, when thermal patterns are provided to the topside of cover layer 61, corresponding portions of thermally transferable ink 62 are transferred to recording layer 60.

As illustrated in FIGS. 12 and 12A, cover sheet 61 includes parallel extending side edges 61A and 61B, and plurality of transversely disposed perforation lines 63 spaced apart in parallel fashion along the longitudinal extent cover sheet 61. Between each adjacent pair of perforation lines 63, a cover layer strip 65 is formed. As shown, each perforation line 63 terminates at a predetermined distance $D_2$ from the right side edge of the cover sheet. As described with regard to the first and second embodiments, this feature facilitates easy removal of a plurality of cover sheet strips in a single pulling operation. As shown, a pair of releasable adhesive strips 64A and 64B are disposed along the side edges of cover sheet. However, to ensure that the recording sheet and the underside of each cover sheet strip 65, adjacent the side edges, are free of adhesive to facilitate easy removal of cover sheet strips, adhesive strips 64A and 64B are disposed at a predetermined distance away from respective side edges. As in the other embodiments, receiver instructions 17 are printed on certain of the cover layer strips in a repeat pattern.

In FIG. 13, a process for making continuous rolls of the composite recording material of FIGS. 12 and 12A, is illustrated. The first step includes producing a roll 66 of plain-paper type recording paper 60 in a conventional manner. The second step involves producing a roll 67 of thermally transmissive, optically opaque cover sheet material 61, having an underside surface bearing a thermally transferable marking ink 62, well known in the art. In order that the cover sheet material 61 is sufficiently thermally transmissive, metallic or functionally equivalent particles can be dispersed throughout cover sheet material during manufacturing.

Having provided rolls 66 and 67, a number of other processing operations schematically illustrated in FIG. 13 are subsequently performed along the transport paths of layer materials 60 and 61. In particular, at printing station 68, opaque obscuring (i.e. interference) patterns 69 can be printed in continuous matter along the upperside of cover sheet material 61, at printing station 70, receiver instructions 17 are printed in a repeat pattern on the upperside of selected cover sheet strips; and at perforation station 44 transverse perforation lines 63 are formed in cover sheet 61. Along the transport path of recording sheet material 60, an opaque obscuring patterns 71 can be printed in a continuous manner on the underside of recording sheet material 60 at printing station 72; and at adhesive application station 73, narrow parallelly extending strips of releasable adhesive 64A and 64B are applied to the upper surface of recording layer material 60. These processed layers 60 and 61 are then brought into contact in an overlying relationship under pressure at station 74, so that cover sheet 61 is disposed over recording sheet 60. As shown, this process results in the production of a continuous length of flexible composite recording material 7''' which is subsequently wound up into a roll configuration 75.

Although in the above embodiment, the width of the message format space and message recording area across the composite material were illustrative as being the industry standard of 8.5 inches, it is understood that this width may vary.

While the particular embodiments shown and described above have proven to be useful in many applications in the facsimile transmission and reception art, further modifications of the present invention herein disclosed will occur to persons skilled in the art to which the present invention pertains. All such modifications are deemed to be within the scope and spirit of the present invention defined by the appended claims.

What is claimed is:

1. Flexible composite material upon which a facsimile message transmitted by a sender and having a confidential and non-confidential message portion, can be recorded at a facsimile receiver, said flexible composite material comprising:

a recording sheet upon which a facsimile message can be recorded, said recording sheet having a predetermined width and a longitudinal extent;

an essentially opaque cover sheet disposed over a substantial portion of said recording sheet, said cover sheet having a plurality of transversely disposed perforation lines spaced apart along the longitudinal extent of said recording sheet, each adjacent pair of transversely disposed perforation lines defining a cover sheet strip which can be selectively removed to reveal a corresponding portion of said recording sheet, wherein one or more of said cover sheet strips consecutively arranged are capable of concealing a sender-definable non-confidential recording area and permit the recording of said non-confidential message portion upon said non-confidential message recording area, and wherein a first plurality of said cover sheet strips consecutively arranged are capable of concealing a sender-definable confidential recording area and permit the recording of said confidential message portion upon said confidential message recording area, while concealing said confidential message portion until one or more of said first plurality of said cover sheet strips are removed from over said confidential message recording area; and a releasable adhesive layer for securing said recording sheet and each said cover sheet strip, said releasable adhesive sheet including a predetermined pattern disposed between at least a portion of said recording sheet and said cover sheet.

2. Flexible composite material upon which a facsimile message transmitted by a sender and having a confidential and non-confidential message portion, can be recorded at a facsimile receiver, said flexible composite material comprising:

a recording sheet upon which a facsimile message can be recorded, said recording sheet having a predetermined width and a longitudinal extent;

an essentially opaque cover sheet disposed over a substantial portion of said recording sheet, said cover sheet having a plurality of transversely disposed perforation lines spaced apart along the longitudinal extent of said recording sheet, each adjacent pair of transversely disposed perforation lines defining a cover sheet strip which can be selectively removed to reveal a corresponding portion of said recording sheet, wherein one or more of said cover sheet strips consecutively arranged are capable of concealing a sender-definable non-confidential recording area and permit the recording of said non-confidential message portion upon said non-confidential message recording area, and wherein a first plurality of said cover sheet strips consecutively arranged are capable of concealing a sender-definable confidential recording area and permit the recording of said confidential message portion upon said confidential message recording area, while concealing said confidential message portion until one or more of said first plurality of said cover sheet strips are removed from over said confidential message recording area; and releasable adhesion means disposed between at least a portion of said recording sheet and each said cover sheet strip, to releasably secure together each said cover sheet strip and said recording sheet.

3. The flexible composite material of claim 2, wherein said releasable adhesion means comprises a releasable adhesive layer.

4. The flexible composite material of claim 2, wherein at least one said cover sheet strip bears preprinted indicia providing instructions for selective removal of at least one said cover sheet strip.

5. The flexible composite material of claim 2, wherein said preprinted indicia includes instructions to remove the uppermost cover sheet strip on said recording sheet.

6. The flexible composite material of claim 2, wherein each said perforation line terminates at a predetermined distance from one side edge of said cover sheet strips so as to facilitate easy removal of said first plurality of cover sheet strips by pulling along in a single diagonal direction, the uppermost cover sheet strip in said first plurality of cover sheet strips.

7. The flexible composite material of claim 2, wherein said recording sheet and said cover sheet are rolled up and stored in a roll configuration for subsequent dispensing and severing in variable lengths.

8. The flexible composite material of claim 2, wherein said cover sheet has a topside and an underside, said underside of said cover sheet bearing a thermally transferable marking sheet, selected portions of which are transferable to said recording sheet when corresponding thermal patterns are provided to the topside of said cover sheet.

9. The flexible composite material of claim 8, wherein said recording sheet and said cover sheet are rolled up and stored in a roll configuration for subsequent dispensing and severing in variable lengths.

10. Flexible composite material upon which a facsimile message transmitted by a sender and having a confidential and non-confidential message portion, can be recorded at a facsimile receiver, said flexible composite material comprising:

a recording sheet upon which a facsimile message can be recorded, said recording sheet having a predetermined width and a longitudinal extent;

an essentially opaque cover sheet disposed over a substantial portion of said recording sheet, said cover layer having a plurality of transversely disposed perforation lines spaced apart along the longitudinal extent of said recording sheet, each adjacent pair of transversely disposed perforation lines defining a cover sheet strip which can be selectively removed to reveal a corresponding portion of said recording sheet, wherein one or more of said cover sheet strips consecutively arranged are capable of concealing a sender-definable non-confidential recording area and permit the recording of said non-confidential message portion upon said non-confidential message recording area, and wherein a first plurality of said cover sheet strips consecutively arranged are capable of concealing a sender-definable confidential recording area and permit the recording of said confidential message portion upon said confidential message recording area, while concealing said confidential message portion until one or more of said first plurality of said cover sheet strips are removed from over said confidential message recording area; and releasable adhesive layer disposed between at least a portion of said recording sheet and each said cover sheet strip, to releasably secure together each said cover sheet strip and said recording sheet in such a manner that one or more of said cover sheet strips covering said non-confidential messages recording area can be firstly removed from said recording sheet without adversely effecting said non-confidential message portion or revealing said confidential message portion, and that one or more of said first plurality of cover sheet strips covering said confidential message recording area can be secondly removed from said recording sheet without adversely effecting said confidential message portion recorded in said confidential message recording area.

11. The flexible composite material of claim 10, wherein each said cover sheet strip has opposing first and second side edges, and each said cover sheet strip and said recording layer are secured to each other adjacent said opposing side edges by a releasable adhesive layer.

12. The flexible composite material of claim 11, wherein said recording sheet and the underside of each said cover sheet strip, adjacent said first side edge, is free of adhesive so as to permit easily removal of each said cover sheet strip.

13. The flexible composite material of claim 12, wherein said recording sheet and the underside of each said cover sheet strip, adjacent said second side edge, is free of adhesive so as to permit easy removal of each said cover sheet strip.

14. Flexible composite material upon which a facsimile message transmitted by a sender and having a confidential and non-confidential message portion, can be recorded at a facsimile receiver, said flexible composite material comprising:

a recording sheet upon which a facsimile message can be recorded, said recording sheet having a predetermined width and a longitudinal extent;

an essentially opaque cover sheet disposed over a substantial portion of said recording sheet, said cover sheet having a plurality of transversely disposed perforation lines spaced apart along the longitudinal extent of said recording sheet, each adjacent pair of transversely disposed perforation lines defining a cover sheet strip which can be selectively removed to reveal a corresponding portion of said recording sheet, wherein one or more of said cover sheet strips consecutively arranged are capable of concealing a sender-definable non-confidential recording area and permit the recording of said non-confidential message portion upon said non-confidential message recording area, and wherein a first plurality of said cover sheet strips consecutively arranged are capable of concealing a sender-definable confidential recording area and permit the recording of said confidential message portion upon said confidential message recording area, while concealing said confidential message portion until one or more of said first plurality of said cover sheet strips are removed from over said confidential message recording area; and releasable adhesive means for releasably adhering each said cover sheet strip and said recording sheet in such a manner that one or more of said cover layer strips covering said non-confidential message recording area can be firstly removed from said recording sheet without adversely effecting said non-confidential message portion, and that one or more of said first plurality of cover sheet strips covering said confidential message recording area can be secondly removed from said recording sheet without adversely effecting said confidential message portion recorded in said confidential message recording area;

said recording sheet including a thermally sensitive layer upon which said facsimile message can be thermally recorded, and said cover sheet being sufficiently thermally transmissive so as to permit thermal printing of said facsimile message upon said thermally sensitive sheet.

15. The flexible composite material of claim 14, wherein said recording sheet and said cover sheet are rolled up and stored in a roll configuration for subsequent dispensing and severing in variable lengths.

* * * * *